United States Patent
Cui et al.

(10) Patent No.: US 12,141,581 B2
(45) Date of Patent: Nov. 12, 2024

(54) PREDICTIVE DEAD STORE ELIMINATION

(71) Applicant: International Business Machines Corporation, Armonk, NY (US)

(72) Inventors: Shimin Cui, North York (CA); Wai Hung Tsang, Markham (CA); Hubert Shun Kwan Tong, Scarborough (CA); Zarko Todorovski, Ajax (CA)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 18/157,990

(22) Filed: Jan. 23, 2023

(65) Prior Publication Data

US 2024/0248716 A1 Jul. 25, 2024

(51) Int. Cl.
*G06F 9/30* (2018.01)
*G06F 8/41* (2018.01)
*G06F 9/32* (2018.01)

(52) U.S. Cl.
CPC ........ *G06F 9/30043* (2013.01); *G06F 8/4435* (2013.01); *G06F 9/325* (2013.01)

(58) Field of Classification Search
CPC ..... G06F 9/30043; G06F 9/325; G06F 8/4435
See application file for complete search history.

(56) References Cited

U.S. PATENT DOCUMENTS

| | | | |
|---|---|---|---|
| 4,656,583 A | 4/1987 | Auslander et al. | |
| 5,999,737 A | 12/1999 | Srivastava | |
| 2003/0149969 A1 | 8/2003 | Ogasawara | |
| 2004/0128660 A1 | 7/2004 | Nair et al. | |
| 2006/0059476 A1 | 3/2006 | McIntosh et al. | |
| 2009/0138864 A1 | 5/2009 | Tal et al. | |
| 2019/0042222 A1* | 2/2019 | Rong | G06F 8/10 |

OTHER PUBLICATIONS

Gupta, Rajiv, Code Optimization as a Side Effect of Instruction Scheduling, Proceedings Fourth International Conference on High-Performance Computing, 1997, 8 pages, [retrieved on Jun. 4, 2024], Retrieved from the Internet: <URL:http://ieeexplore.ieee.org/>.*
Dai, Xiaoru, et al., A general compiler framework for speculative optimizations using data speculative code motion, International Symposium on Code Generation and Optimization, 2005, 11 pages, [retrieved on Jun. 4, 2024], Retrieved from the Internet: <URL:http://ieeexplore.ieee.org/>.*
Butts et al., "Dynamic Dead-Instruction Detection and Elimination," ACM SIGOPS Operating Systems Review, vol. 36, Issue 5, Dec. 2002, 12 pages. https://ftp.cs.wisc.edu/sohi/papers/2002/deadinstructions.asplos.pdf.

* cited by examiner

*Primary Examiner* — Geoffrey R St Leger
(74) *Attorney, Agent, or Firm* — Yee & Associates, P.C.

(57) ABSTRACT

Predictive dead store elimination is provided. The method comprises identifying, in a program, a first store operation and a second store operation in a program loop that comprise a store pair with a same loop-invariant base address and determining whether the store pair is a predictive dead store elimination candidate. Responsive to a determination that the store pair is a predictive dead store elimination candidate, the method eliminates the first store operation in each iteration of the program loop, except the last DSRC (dead store recurrence constant) iterations and sinks the first store operation in the last DSRC iterations to after the program loop.

20 Claims, 6 Drawing Sheets

```
1    for (int i = 0; i < N; ++i)
2        A[i+2] = A[i] + A[i+1]
```

FIG. 3

```
1    a0 = A[0];
2    a1 = A[1];
3    for (int i = 0; i < N; ++i) {
4        A[i+2] = a2 = a0 + a1;
5        a0 = a1;
6        a1 = a2;
7    }
```

FIG. 4

```
1    do {
2        A[i] = A[i + 1];
3        i = i + 1;
4        A[i] = a;
5    } while (/*...*/);
```

FIG. 5

```
1    do {
2        A[i] = A[i + 1];
3        i = i + 1;
4        A[i] = a;
5'       if (/*...*/) break;
2'       A[i] = A[i + 1];
3'       i = i + 1;
4'       A[i] = a;
5    } while (/*...*/);
```

FIG. 6

```
1    do {
2        A[i] = A[i + 1];
3        i = i + 1;
4    } while (/*...*/); // condition does not modify i or A
5    A[i] = a;
```

FIG. 7

```
1    %i = phi i64 [ %i0, %entry ], [ %inc, %loop ]
2    %inc = add nsw i64 %i, 1
3    %A_inc = getelementptr inbounds i32, ptr %A, i64 %inc
4    %0 = load i32, ptr %A_inc, align 4
5    %A_i = getelementptr inbounds i32, ptr %A, i64 %i
6    store i32 %0, ptr %A_i, align 4
7    store i32 %a, ptr %A_inc, align 4
8    %cond = ...
9    br i1 %cond, label %loop, label %exit
```

FIG. 10

PREDICTIVE DEAD STORE ELIMINATION

BACKGROUND

1. Field

The present disclosure relates generally to an improved computing system, and more specifically to a method for dead store elimination.

2. Background

Dead store refers to an assignment to a variable in code where the assigned value is not read by any subsequent instruction, thereby wasting processor time and memory. Dead store elimination is a compiler optimization process that detects and removes such assignments. For example, if two stores to the same location have no intervening load, the first store is unnecessary and is removed.

SUMMARY

An illustrative embodiment provides a computer-implemented method for predictive dead store elimination. The method comprises identifying, in a program, a first store operation and a second store operation in a program loop that comprise a store pair with a same loop-invariant base address and determining whether the store pair is a predictive dead store elimination candidate. Responsive to a determination that the store pair is a predictive dead store elimination candidate with a dead store recurrence constant (DSRC) value, the method eliminates the first store operation in each iteration of the program loop, except the last DSRC iterations, and sinks the first store operation in the last DSRC iterations to after the program loop. According to other illustrative embodiments, a computer system, and a computer program product for predictive dead store elimination are provided.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 2 depicts an example of a dead store elimination opportunity;

FIG. 3 depicts an example of a predictive commoning opportunity;

FIG. 4 depicts an example of an optimized program loop after predictive commoning;

FIG. 5 depicts an example program loop to which predictive dead store elimination of the illustrative embodiments may be applied;

FIG. 6 depicts the example program loop in FIG. 5 unrolled by 2;

FIG. 7 depicts the program loop in FIG. 5 after application of predictive dead store elimination in accordance with an illustrative embodiment;

FIG. 10 depicts an example program loop as the subject of an example of determining if a store is a predictive dead store elimination candidate in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
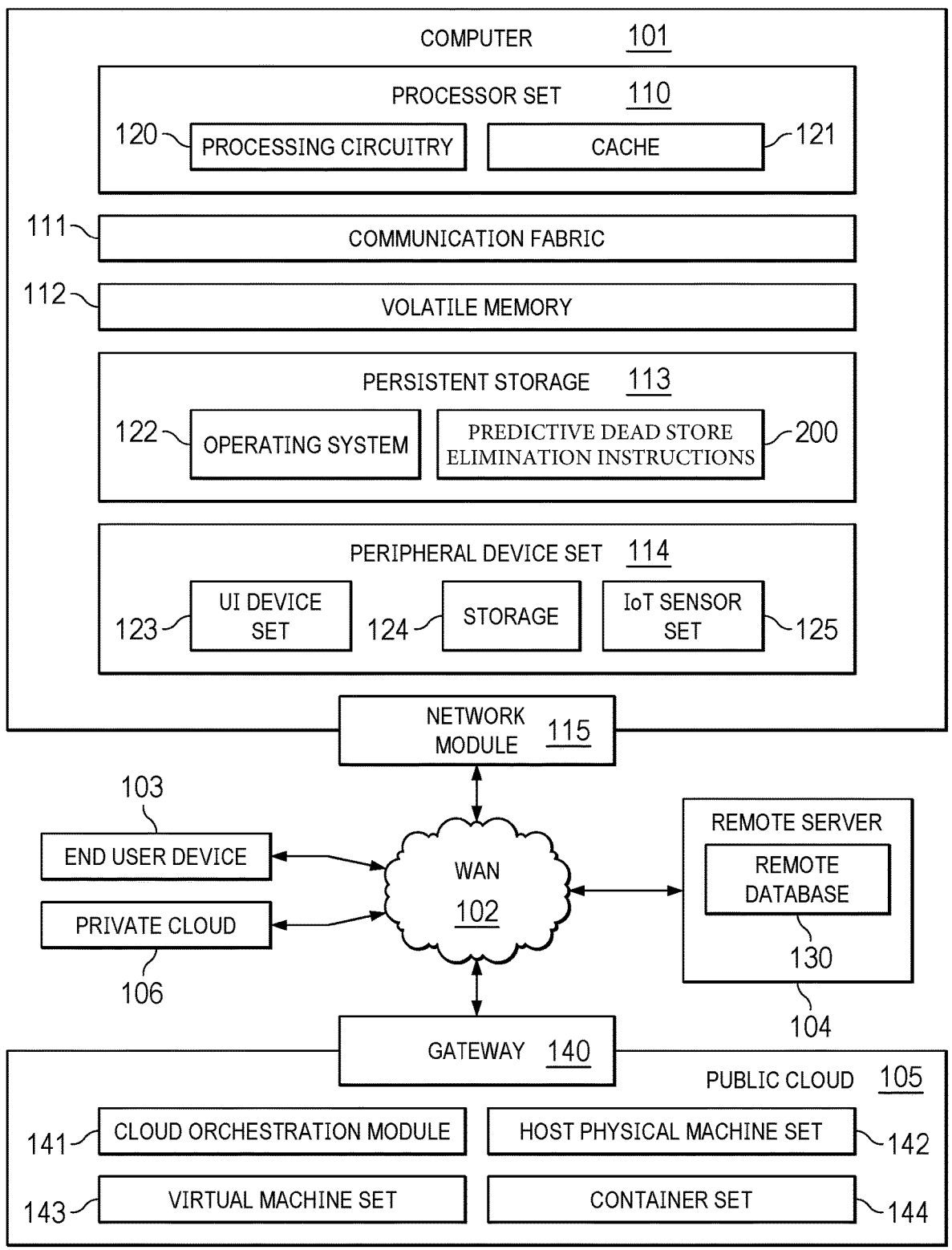
FIG. 1 depicts a pictorial representation of a computing environment in which illustrative embodiments may be implemented.

With reference now to the figures, and in particular, with reference to FIG. 1, a diagram of a data processing environment is provided in which illustrative embodiments may be implemented. It should be appreciated that FIG. 1 is only meant as an example and are not intended to assert or imply any limitation with regard to the environments in which different embodiments may be implemented. Many modifications to the depicted environment may be made.

FIG. 1 depicts a pictorial representation of a computing environment in which illustrative embodiments may be implemented. Computing environment 100 contains an example of an environment for the execution of at least some of the computer code involved in performing the inventive methods, such as predictive dead store elimination instructions 200. In addition to predictive dead store elimination instructions 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and predictive dead store elimination instructions 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in predictive dead store elimination instructions 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. Predictive dead store elimination instructions included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account that dead store elimination (DSE) is a compiler optimization that intends to remove a store that is not read by any subsequent instruction. FIG. 2 depicts an example of a DSE opportunity. In this simple case, there is no read from between the two stores at line 1 and 2. A read after line 2 would be reading from the store at line 2. Therefore, the store at line 1 is considered to be a dead store and can be safely eliminated.

The illustrative embodiments also recognize and take into account that predictive commoning is common subexpression elimination (CSE) across program loop iterations. CSE is a compiler optimization that finds instances of subexpressions that evaluate to the same value and replaces them with a single temporary variable holding the computed value.

FIG. 3 depicts an example of a predictive commoning opportunity. In this example, at an iteration of the program loop where i is equal to k, A[k] and A[k+1] are loaded then added together and stored to A[k+2]. At the next iteration, A[k+1] and A[k+2] would be loaded then added together and stored to A[k+3]. Note that the values of A[k+1] and A[k+2] are known from the previous iteration. Therefore, two loads can be avoided if their value is saved in temporary variables (potentially stored in registers).

FIG. 4 depicts an example of an optimized program loop for the loop in FIG. 3 after predictive commoning. In FIG. 4, the result of the addition, i.e., A[k+2] from FIG. 3, is saved in a1 indirectly through a2. Moreover, A[k+1] is saved in a0. In this example, application of predictive commoning was able to remove two loads per loop iteration.

The illustrative embodiments provide a method to combine dead store elimination and predictive commoning to create a predictive dead store elimination optimization.

As used herein, a "number of," when used with reference to objects, means one or more objects. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, a "computer instruction," or "computer program", means one step or a set of steps that includes information on how to operate, perform, or maintain particular computer software or hardware. For example, a "computer instruction" can be a computer program instruction in the form of lines of code or source code that are executable by a computer system.

FIG. 5 depicts an example program loop to which predictive dead store elimination of the illustrative embodiments may be applied. In this example, at an iteration of the program loop where i is equal to k at the beginning of the loop, the address of A[i] at line 2 is equal to A[k], the address of A[i] at line 4 from the previous iteration is also equal to A[k], and—in between the two store instructions—A[k] is not read from. Therefore, the store at line 4 can be considered to be a dead store, except for the last iteration of the loop, where there is no future store within the code excerpt that overrides it.

To better illustrate this, imagine the loop in FIG. 5 can be unrolled by 2 as shown in FIG. 6. In this example, it can be seen that lines 4 and 2' store to the same address, and there is no read in between the two store instructions. Therefore, the store at line 4 can be eliminated simply by DSE if line 5' can be eliminated (however, the store at line 4' remains). Since the loop trip count is unknown at compile time, the predictive dead store elimination of the illustrative embodiments can always remove more stores than the combination of loop unrolling with DSE. Furthermore, loop unrolling is not always beneficial.

FIG. 7 depicts the program loop in FIG. 5 after application of predictive dead store elimination in accordance with an illustrative embodiment. With Predictive Dead Store Elimination, the store at line 4 in FIG. 5 can be eliminated in each program loop iteration except the last one, and the store of the last iteration is sunk after the loop, as shown in FIG. 7. The number of stores eliminated is the number of program loop iterations minus one, which can contribute to significant performance gains.

Figure 8:
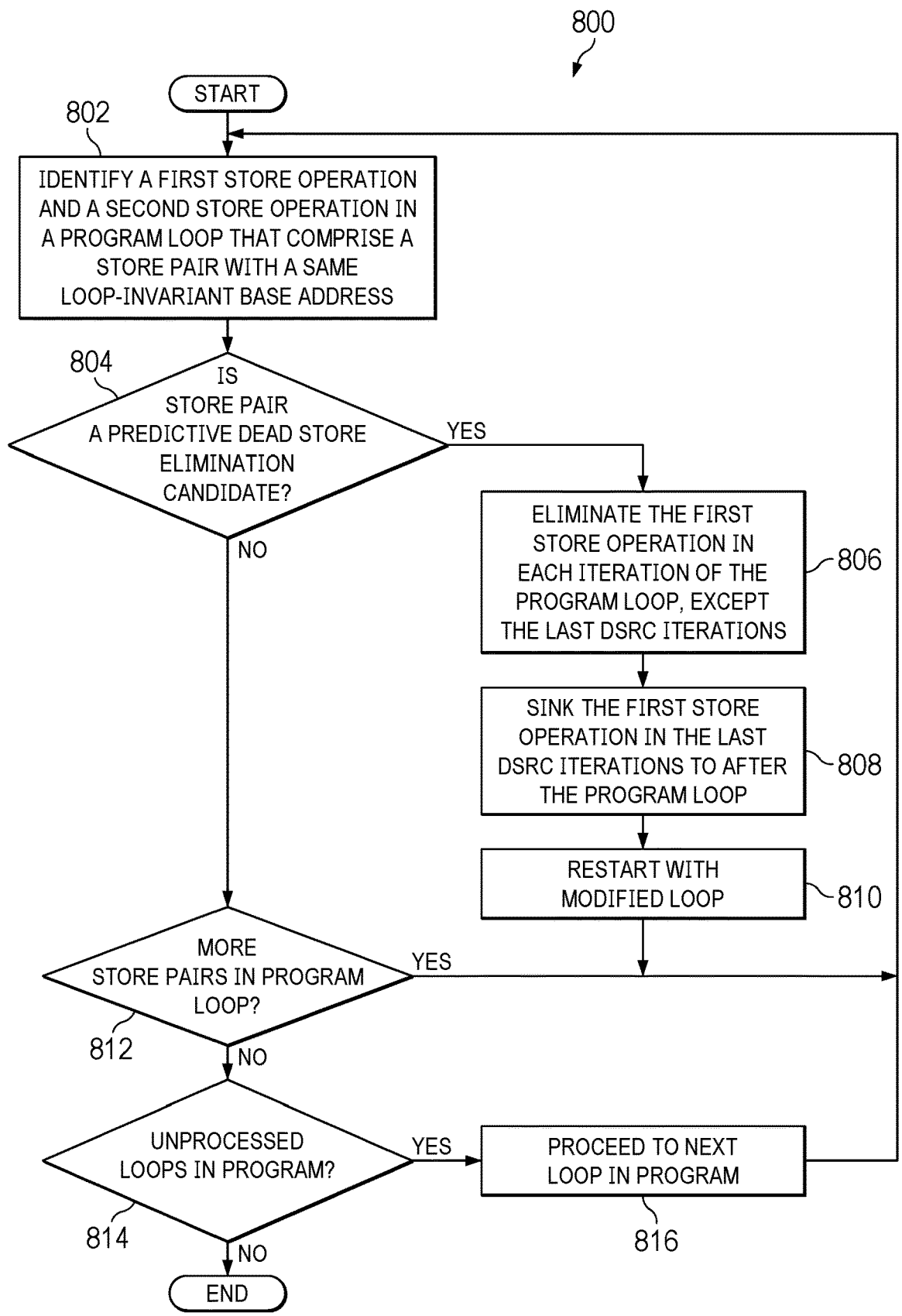
FIG. 8 depicts a flowchart of a process for predictive dead store elimination in accordance with an illustrative embodiment.

FIG. 8 depicts a flowchart of a process for predictive dead store elimination in accordance with an illustrative embodiment. Process in 800 can be in computing environment 100 in FIG. 1. For each loop in the program, the optimization iterates over each store pair (s1, s2) in the body of the loop. For each store pair, the optimization determines if the pair is a predictive dead store elimination candidate. If one or more predictive dead store elimination candidates are determined for the loop, the optimization will transform the loop.

Process 800 begins by identifying, in a program, a first store operation and a second store operation in a program loop that comprise a store pair with a same loop-invariant base address (step 802). Process 800 then determines whether the store pair is a predictive dead store elimination candidate (step 804). Responsive to a determination that the store pair is not a predictive dead store elimination candidate, process 800 proceeds to the next store pair (if any) for the same program loop (step 812) until all store pairs in the program loop have been processed.

Responsive to a determination that the store pair is a predictive dead store elimination candidate, process 800 eliminates the first store operation in each iteration of the program loop, except the last DSRC (dead store recurrence constant) iterations (step 806) and sinks the first store operation in the last DSRC iterations to after the program loop (step 808). For example, for a loop that will iterate N times, the last DSRC iterations comprise the (N−DSRC+1)th iteration to the Nth iteration, inclusive. After sinking the first store, the process 800 repeats with the modified loop (step 810).

In response to having processed all store pairs for the program loop (step 812), process 800 determines if there are any unprocessed loops left in the program (step 814). Responsive to a determination that there are remaining unprocessed loops in the program, process 800 proceeds to processing a next program loop in the program (step 816).

Responsive to a determination that there are no remaining unprocessed loops in the program, process 800 ends.

Figure 9:
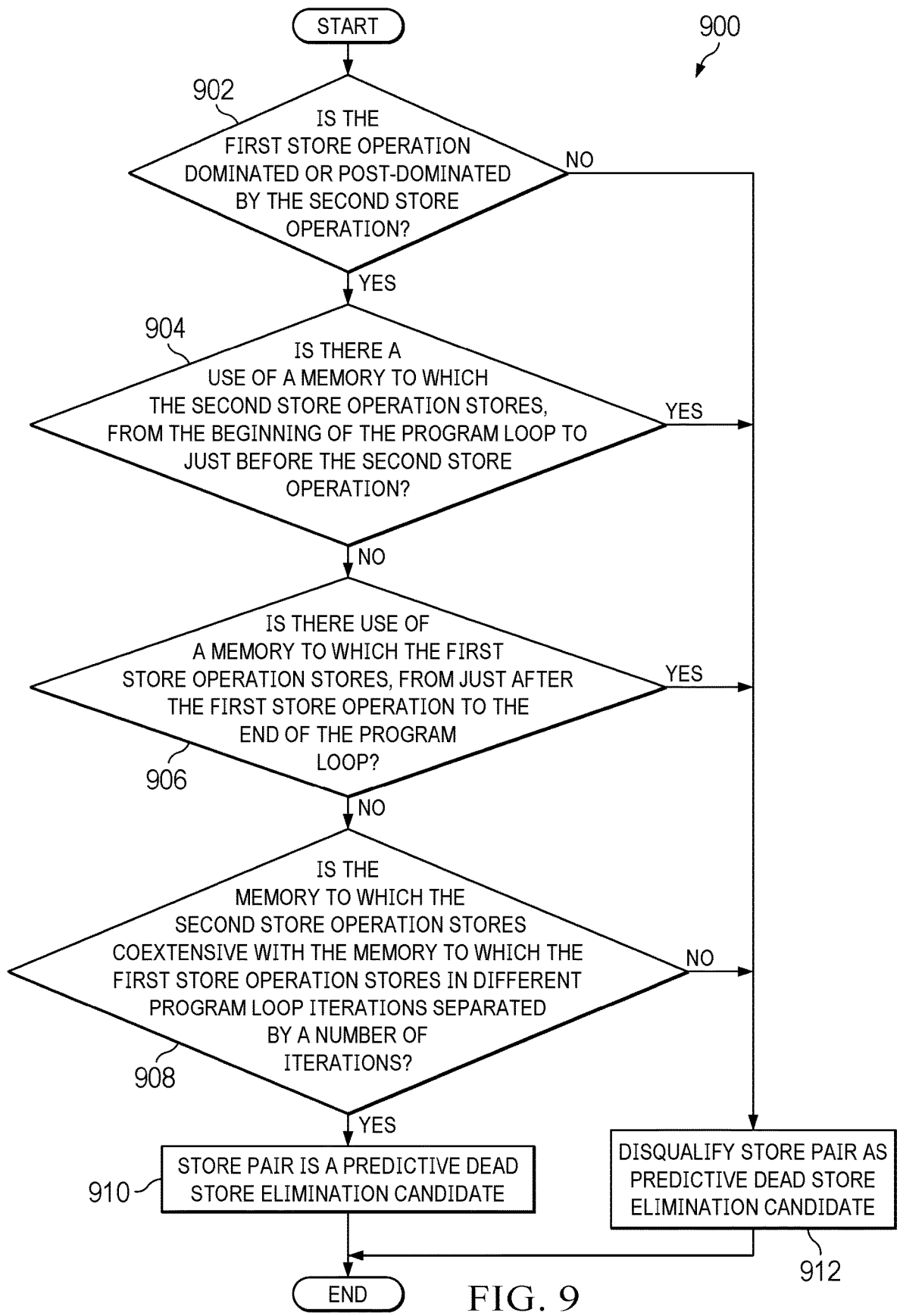
FIG. 9 depicts a flowchart of a process for determining if a store pair is a predictive dead store elimination candidate in accordance with an illustrative embodiment.

FIG. 9 depicts a flowchart of a process for determining if a store pair is a predictive dead store elimination candidate in accordance with an illustrative embodiment. Process 900 is a detailed example of step 804 in FIG. 8.

Process 900 begins by determining whether the first store operation is dominated or post-dominated by the second store operation (step 902). For a store pair (s1, s2) with the same loop-invariant base address, if s1 executes after s2 in a single loop iteration, then the analysis checks that s2 dominates s1. Otherwise, if s2 executes after s1 in a single loop iteration, then the analysis checks that s2 post-dominates s1. A determination of neither domination nor post-domination disqualifies the store pair as a dead store elimination candidate (step 912).

In response to a determination that the first store operation is dominated or post-dominated by the second store operation, process 900 determines whether there is a use of a memory location to which the second store operation stores, from the beginning of the program loop to just before the second store operation (step 904). This analysis may use existing memory analyses (e.g., Dependency Analysis or MemorySSA) to check that there are no memory use/defs of the pointer that s2 stores to from the beginning of the loop to just before s2. If there is such a use of the memory, the store pair is disqualified as a dead store elimination candidate (step 912).

In response to a determination that there is no use of the memory to which the second store operation stores, from the beginning of the program loop to just before the second store operation, process 900 determines whether there is use of a memory to which the first store operation stores, from just after the first store operation to the end of the program loop (step 906). The analysis checks that there are no memory use/defs of the pointer to which s1 stores to from just after s1 to the end of the loop. The presence of such a memory use disqualifies the store pair as a dead store elimination candidate (step 912).

In response to a determination that there is no use of the memory to which the first store operation stores, from just after the first store operation to the end of the program loop, process 900 determines whether the memory to which the second store operation stores is coextensive with the memory to which the first store operation stores in different program loop iterations separated by a number of iterations (step 908). The analysis checks if the pointers that s1 and s2 store to are equivalent in different loop iterations when separated by a number of iterations. Determining coextensiveness of the memory may comprise determining whether the width of the stores are equivalent and whether there is a positive integer k such that the index value i1 applied to the loop-invariant base address to form the address of the memory to which the first store operation stores at an iteration count I is equal to the index value i2 applied to the loop-invariant base address to form the address of the memory to which the second store operation stores at an iteration whose iteration count is that of the aforementioned iteration count plus the positive integer (that is, I+k).

The integer k so determined is called the dead store recurrence constant (DSRC) for this candidate store pair. The powerful symbolic analysis of chains of recurrence for loops, such as Scalar Evolution analysis, implemented in LLVM can be used or extended for this equivalence checking. For the simple case, for example, if the loop step is an addition of a constant value c, then process 900 checks if i2+c*k=i1 (both i1 and i2 are expressions within the same iteration) is true for a positive integer k. As an alternative example, if the loop step is a multiplication of a constant value c, then we want to check if i2*c*k=i1 (both i1 and i2 are expressions within the same iteration) is true for a positive integer k. If all of the above conditions are met, then the analysis determines the store pair to be a predictive dead store elimination candidate.

If there is no value k for which the memory stored to is coextensive, the store pair is disqualified as a dead store elimination candidate (step 912). If there exists a value k for which the memory stored to is coextensive, the store pair is qualified as a dead store elimination candidate (step 910). Process 900 then ends.

FIG. 10 depicts an example program loop as the subject of an example of determining if a store is a predictive dead store elimination candidate in accordance with process 900. In this example, there are two stores in the loop body at lines 6 and 7. There are two possible store pairs (6, 7) and (7, 6) using line numbers to reference them. Considering the store pair (7, 6), the two stores belong to the same basic block, and 7 is after 6 in the control flow. Therefore, 7 is dominated by 6. The first condition is satisfied. Assuming the instruction at line 8 does not read or write memory, the only other memory instruction in the loop is line 4. Line 4 is reading from %A_inc which is different from the pointer 6 stores to (%A_i). The index of %A_i is % i=phi i64 [ % i0, % entry], [ % inc, % loop]', and % inc is the index of %A_inc. The DSRC is 1, because the loop step, c, is 1 and % i+c*k=% inc for k=1. Therefore, (7, 6) is indeed a predictive dead store elimination candidate with DSRC=1.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for predictive dead store elimination by a compiler optimization technique performed by a compiler executing on a data processing system comprising a number of processors, the method comprising:
   using the number of processors to perform the steps of:
   identifying, in a program by the compiler, a first store operation and a second store operation in a program loop that comprise a store pair with a same loop-invariant base address;
   determining, by the compiler, whether the store pair is a predictive dead store elimination candidate;

responsive to a determination that the store pair is a predictive dead store elimination candidate:
  eliminating, by the compiler, the first store operation in each iteration of the program loop, except last dead store recurrence constant (DSRC) iterations; and
  sinking, by the compiler, the first store operation in the last DSRC iterations to after the program loop, wherein a size of the program is reduced by the compiler optimization technique.

2. The method of claim 1, wherein determining whether the store pair is a predictive dead store elimination candidate comprises:
  determining, by the compiler, whether the first store operation is dominated or post-dominated by the second store operation, wherein a determination of neither domination nor post-domination disqualifies the store pair as a dead store elimination candidate.

3. The method of claim 2, wherein, in response to a determination that the first store operation is dominated or post-dominated by the second store operation, the compiler determining whether there is a use of a memory to which the second store operation stores, from the beginning of the program loop to just before the second store operation, wherein the presence of such a memory use disqualifies the store pair as a dead store elimination candidate.

4. The method of claim 3, wherein, in response to a determination that there is no use of the memory to which the second store operation stores, from the beginning of the program loop to just before the second store operation, the compiler determining whether there is use of a memory to which the first store operation stores, from just after the first store operation to the end of the program loop, wherein the presence of such a memory use disqualifies the store pair as a dead store elimination candidate.

5. The method of claim 4, wherein, in response to a determination that there is no use of the memory to which the first store operation stores, from just after the first store operation to the end of the program loop, the compiler determining whether the memory to which the second store operation stores is coextensive with the memory to which the first store operation stores in different program loop iterations separated by a number of iterations, wherein such a case of the memory stored to being coextensive qualifies the store pair as a dead store elimination candidate.

6. The method of claim 5, wherein determining the coextensiveness of the memory to which the second store operation stores and the memory to which the first store operation stores in different program loop iterations separated by a number of iterations comprises the compiler determining whether the width of stores are equivalent and whether there is a positive integer such that an index value being applied to the loop-invariant base address to form an address of the memory to which the first store operation stores at an iteration count is equal to an index value being applied to the loop-invariant base address to form an address of the memory to which the second store operation stores at an iteration whose iteration count is that of the aforementioned iteration count plus the positive integer.

7. The method of claim 1, further comprising, in response to a determination that the store pair is not a predictive dead store elimination candidate, the compiler repeating with a next store pair for the same program loop until all store pairs in the program loop have been processed.

8. The method of claim 7, further comprising, in response to having processed all store pairs for the program loop, the compiler processing a next program loop in the program.

9. The method of claim 1, wherein, after sinking the first store, the compiler processing of the program loop restarts with a modified loop.

10. A system for predictive dead store elimination by a compiler optimization technique performed by a compiler executing on a data processing system comprising one or more processors, the system comprising:
  a storage device that stores program instructions; and
  the one or more processors operably connected to the storage device and configured to execute the program instructions to cause the system to:
  identify, in a program by the compiler, a first store operation and a second store operation in a program loop that comprise a store pair with a same loop-invariant base address;
  determine, by the compiler, whether the store pair is a predictive dead store elimination candidate;
  responsive to a determination that the store pair is a predictive dead store elimination candidate:
    eliminate, by the compiler, the first store operation in each iteration of the program loop, except last dead store recurrence constant (DSRC) iterations; and
    sink, by the compiler, the first store operation in the last DSRC iterations to after the program loop, wherein a size of the program is reduced by the compiler optimization technique.

11. The system of claim 10, wherein determining whether the store pair is a predictive dead store elimination candidate comprises:
  determining, by the compiler, whether the first store operation is dominated or post-dominated by the second store operation, wherein a determination of neither domination nor post-domination disqualifies the store pair as a dead store elimination candidate.

12. The system of claim 11, wherein, in response to a determination that the first store operation is dominated or post-dominated by the second store operation, the compiler determining whether there is a use of a memory to which the second store operation stores, from the beginning of the program loop to just before the second store operation, wherein the presence of such a memory use disqualifies the store pair as a dead store elimination candidate.

13. The system of claim 12, wherein, in response to a determination that there is no use of the memory to which the second store operation stores, from the beginning of the program loop to just before the second store operation, the compiler determining whether there is use of a memory to which the first store operation stores, from just after the first store operation to the end of the program loop, wherein the presence of such a memory use disqualifies the store pair as a dead store elimination candidate.

14. The system of claim 13, wherein, in response to a determination that there is no use of the memory to which the first store operation stores, from just after the first store operation to the end of the program loop, the compiler determining whether the memory to which the second store operation stores is coextensive with the memory to which the first store operation stores in different program loop iterations separated by a number of iterations, wherein such a case of the memory stored to being coextensive qualifies the store pair as a dead store elimination candidate.

15. The system of claim 14, wherein determining the coextensiveness of the memory to which the second store operation stores and the memory to which the first store operation stores in different program loop iterations separated by a number of iterations comprises the compiler determining whether the width of stores are equivalent and whether there is a positive integer such that an index value being applied to the loop-invariant base address to form an address of the memory to which the first store operation stores at an iteration count is equal to an index value being applied to the loop-invariant base address to form an address of the memory to which the second store operation stores at an iteration whose iteration count is that of the aforementioned iteration count plus the positive integer.

16. The system of claim 10, further comprising, in response to a determination that the store pair is not a predictive dead store elimination candidate, the compiler repeating with another store pair for the same program loop until all store pairs in the program loop have been processed.

17. The system of claim 16, further comprising, in response to having processed all store pairs for the program loop, the compiler processing a next program loop in the program.

18. The system of claim 10, wherein, after sinking the first store, the compiler processing of the program loop restarts with a modified loop.

19. A computer program product for predictive dead store elimination by a compiler optimization technique performed by a compiler executing on a data processing system, the computer program product comprising:
    a persistent storage medium having program instructions embodied thereon to perform the steps of:
    identifying, in a program by the compiler, a first store operation and a second store operation in a program loop that comprise a store pair with a same loop-invariant base address;
    determining, by the compiler, whether the store pair is a predictive dead store elimination candidate;
    responsive to a determination that the store pair is a predictive dead store elimination candidate:
        eliminating, by the compiler, the first store operation in each iteration of the program loop, except last dead store recurrence constant (DSRC) iterations; and
        sinking, by the compiler, the first store operation in the last DSRC iterations to after the program loop, wherein a size of the program is reduced by the compiler optimization technique.

20. The computer program product of claim 19, further comprising:
    in response to a determination that the store pair is not a predictive dead store elimination candidate, the compiler repeating with a next store pair for the same program loop until all store pairs in the program loop have been processed; and
    in response to having processed all store pairs for the program loop, the compiler processing a next program loop in the program.

* * * * *